Nov. 15, 1966   E. J. DONALDSON ETAL   3,285,536
PIE ROTARY DAMPER
Filed June 10, 1964   2 Sheets-Sheet 1
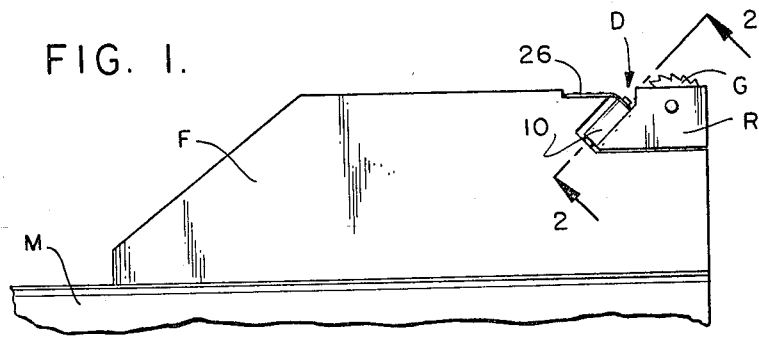
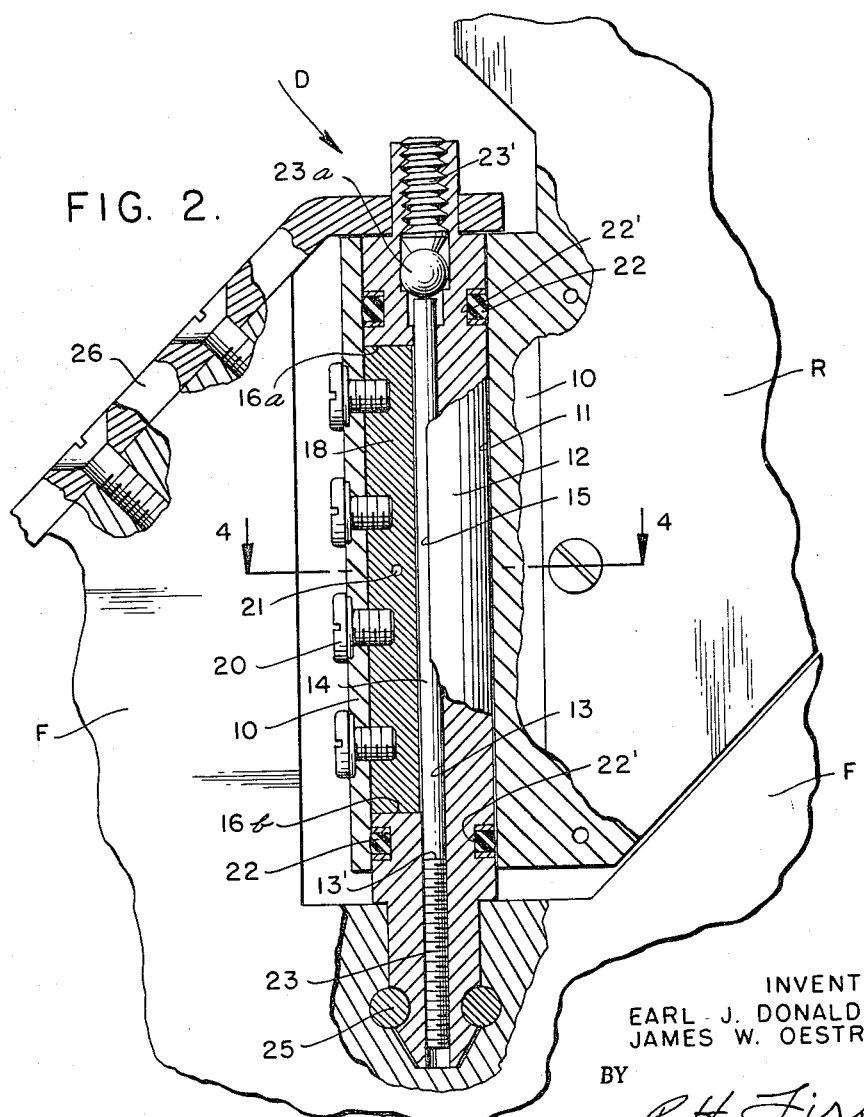
INVENTORS.
EARL J. DONALDSON
JAMES W. OESTREICH
BY
*P. H. Firsht*
ATTORNEY.

Nov. 15, 1966  E. J. DONALDSON ETAL  3,285,536
PIE ROTARY DAMPER

Filed June 10, 1964 2 Sheets-Sheet 2

INVENTORS.
EARL J. DONALDSON
JAMES W. OESTREICH
BY
P. H. Firsht
ATTORNEY.

United States Patent Office 3,285,536
Patented Nov. 15, 1966

3,285,536
PIE ROTARY DAMPER
Earl J. Donaldson and James W. Oestreich, China Lake, Calif., assignors to the United States of America as represented by the Secretary of the Navy
Filed June 10, 1964, Ser. No. 374,217
5 Claims. (Cl. 244—3.21)

The invention described herein may be manufactured and used by or for the Government of the United States of America for governmental purposes without the payment of any royalties thereon or therefor.

The present invention relates to improvements in hydraulic dampers and more particularly to a new and improved rotary hydraulic damper of the type utilizing a rotating member for forcing fluids from a first sealed chamber into a second sealed chamber, through a restrictive orifice passage or port, to provide output or reactive torques.

Common design of rotary dampers, sometimes referred to as dashpots, can be classified according to two basic principles of dissipating energy, i.e., viscous and hydraulic pumping. Viscous dampers employ forces necessary to shear a viscous fluid between two surfaces as one surface is caused to move with respect to the other. Consequently, these devices are highly sensitive to temperature change. Hydraulic dampers, however, employ forces necessary to pump fluid from one sealed chamber to another and are readily adaptable for uses where high performance devices are required to function in an environment of radically changing temperature.

Conventionally, hydraulic rotary dampers are provided with two or more sealed chambers established between a rotating vane, mounted on an input shaft, and a stationary vane which may be fixed to the damper's housing. Normally, certain of these chambers communicate through ports so that as angular rate is imparted to the shaft the rotating vane tends to reduce the volume of certain of the chambers while increasing volume of the others as fluid is displaced through the ports. Thus the forces acting to displace the rotating vane tend to reduce the volume and increase the fluid pressure in given chambers. These forces are opposed by reaction forces developed on the walls of the given chambers in which the fluid is undergoing pressurization. The reaction forces serve to establish an output torque for the damper and tend to increase in magnitude as the fluid pressures increase. Therefore, it is readily apparent that where an increasing output torque is required, the fluid pressures are necessarily caused to increase and act throughout the chamber.

Among the most critical problems confronting designers of hydraulic rotary dampers has been the inability to provide a damper having chambers provided with adequate seals for withstanding the chamber pressures developed as the required output torque is developed by the damper.

Another problem encountered in the design of rotary dampers, particularly those of the type used in missile and rocket damping systems, but not unique thereto, is that high output torque must be provided from miniaturized dampers. This requires that the output shaft and rotating vane be sufficiently strong to develop the required reaction forces. Conventionally, the rotating vane has been mounted to extend laterally from a center-mounted spindle or shaft. This design has led to a shearing of the shaft itself and/or a failure of the vane under operative conditions, due primarily to the fact that no known design heretofore accommodated construction of a damper from components having sufficient size to provide the required component strength. Further, where attempts to provide components of sufficient size have been made utilizing conventional designs, it has been found that the damper lacked certain response characteristics, namely, low threshold. Threshold is particularly important where the damper is to be coupled with missile control surfaces of the type disclosed in U.S. Patent No. 2,935,947, issued to L. T. Jagiello, May 10, 1960, and commonly referred to as "rollerons." This is because the damper utilized must be provided with a low initial or "break-away" torque in order that it may immediately react for providing the necessary trim or stability required by an in-flight guided missile.

Therefore, the purpose of this invention is to provide a simple, economical, and miniaturized damper, which overcomes the hereinbefore mentioned disadvantages, and which is capable of rendering high-performance when subjected to an operative environment of high pressures, vibration, acceleration and changing temperature.

An object of the instant invention is to provide a sensitive and miniaturized rotary hydraulic damper, which is capable of developing high output torques.

Another object is to provide a rugged rotary damper adaptable for use with rocket propelled missile "rollerons."

A further object is to provide simple and economical chamber sealing means in rotary hydraulic dampers.

A still further object is to provide a high-performance rotary damper having low break-away torque characteristics.

Yet another object of the present invention is to provide a rotary damper of a reduced size and weight, having a high degree of reliability and being capable of providing an increased range of output torques.

Other objects, advantages and novel features of the invention will become apparent from the following detailed description of the invention when considered in conjunction with the accompanying drawings wherein:

FIG. 1 is a side view of a fin and "rolleron" for a rocket propelled missile, illustrating one application of the hydraulic rotary damper of the instant invention;

FIG. 2 is an enlarged and rotated cross section view taken generally along lines 2—2 of FIG. 1, illustrating the damper of FIG. 1;

Figure 4:
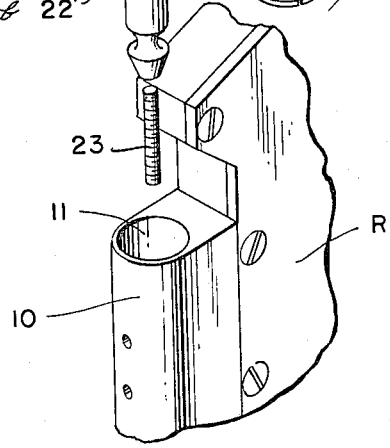

FIG. 4 comprises a cross-sectional view taken along lines 4—4 of FIG. 2; and

Figures 5A, 5B:
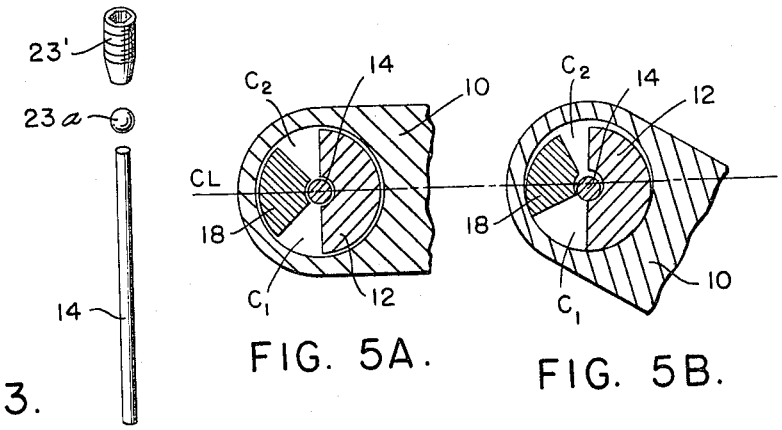

FIGS. 5A and 5B together comprise successive and exaggerated schematic views illustrating typical shaft, pie-vane, and sealing rod displacement, which tends to occur as the damper housing is operatively rotated to vary chamber pressures within the damper chamber.

Turning now to the drawings wherein like reference characters designate like or corresponding parts through the several views, there is shown in FIG. 1 a portion of a rocket propelled missile M having a radially extending conventional control surface, wing or fin F, which serves to stabilize the missile M in flight. The aft portion of the wing or fin F is provided with a "cut-out" section in which is mounted a "rolleron" R pivotally secured to the fin F through the damper D of the present invention. The "rolleron" R may be stabilized by a gyro G, of suitable design. The gyro G forms no part of the instant invention, therefore, a detailed description is omitted in the interest of brevity. However, it is to be understood that the "rolleron" R is gyro-stabilized by the gyro G so that in the event the missile M starts to "roll" during flight the "rolleron" R is caused to pivot out-of-line with the fin F to present an aerodynamic surface to the airstream for forcing the missile M to "right" itself.

It is to be clearly understood that the damper D of the instant invention is not limited to use to aerodynamic control surfaces, such as the "rolleron" R, but my be utilized in many areas where miniaturization and high-performance are of the upmost importance. However, for purposes of describing one embodiment of the invention, the damper D is hereinafter referred to as being connected for damping the gyro stabilized "rolleron" R and providing means for pivotally coupling the "rolleron" R with a missile fin F.

Figure 3:
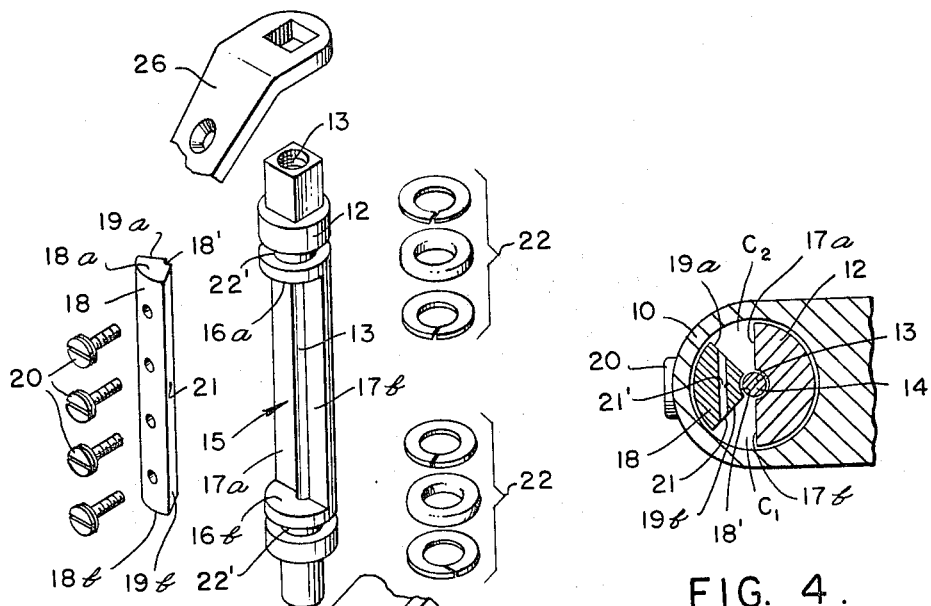
FIG. 3 is an exploded view, on a reduced scale, of the damper illustrated in FIG. 2.

Turning now to FIGS. 2 and 3, a housing 10 is provided and may, if desired, be cast as a part of the "rolleron" case. A cylinder 11 is formed in the housing 10 and serves to slidingly receive an elongated rotor or in-put shaft 12 having a diameter substantially that of the cylinder, whereby the circumferential surfaces of the shaft 12 may be slidingly displaced with respect to the surface or wall of the cylinder 11.

The rotor shaft 12 is provided with a concentric bore 13 which extends substantially through the shaft 12 for receiving a sealing rod 14, hereinafter more fully described. Where desired, the bore 13 may terminate within the shaft 12 near one end thereof to provide a retaining seat 13′ for seating the sealing rod 14. In practice, the sealing rod 14 has been formed of various materials, including both well-known synthetic plastics and steels. However, the rod 14 must be formed from materials which will withstand substantial forces of compression, as well as shear, as will hereinafter be more fully appreciated.

A relieved section or cleavage, generally designated 15, is formed in the shaft 12 by milling an accurate section from the shaft 12. The cleavage 15 extends between two polished bearing surfaces 16a and 16b. The surfaces 16a and 16b extend laterally from the bore 13 to the circumference of shaft 12 and define the ends of the cleavage 15. While the drawings illustrated a removed arcuate section of 180°, or one half of the cylindrical shaft 12, it is to be understood that the section removed may comprise an arcuate section of more or less than 180°, as found desirable according to the uses for which the damper D is to be employed. The vertical or longitudinal surfaces of the cleavage 15 provide a pair of substantially flat vane defining surfaces 17a and 17b lying in mutually displaced radial planes extending between the bore 13 and the circumference of the shaft 12, or the wall of the cylinder 11. As illustrated in FIG. 3, the surfaces 17a and 17b are disposed in oppositely extending radial planes.

In order to divide the cleavage 15 into a pair of pressure chambers $C_1$ and $C_2$, FIG. 4, an elongated vane 18, having a cross-section in the shape of a sector, is inserted into the cleavage 15 and fixed to the wall of the cylinder 11 in a manner such as to divide the cleavage into a pair of elongated, radially extending fluid pressure chambers $C_1$ and $C_2$. The vane 18 comprises an elongated arcuate member, so formed at its circumference as to mate with the wall of the cylinder 11, and possess a substantially shorter chord than the arcuate section removed from the cleavage 15. Hence, it will be understood that the pie-vane 18 is of a generally wedge-shaped configuration and is inserted into the cleavage 15 to divide the cleavage into a pair of elongated, wedge-shaped fluid pressure chambers $C_1$ and $C_2$. The pie-vane 18 is further provided with a longitudinal cleavage or relief 18′, FIGS. 3 and 4, which extends the full length of the pie-vane and serves to receive therein a longitudinal portion of the sealing rod 14 for establishing a physical engagement and a subsequent seal between the surfaces thereof.

In order that the chambers $C_1$ and $C_2$ may be sealed, the end surfaces 18a and 18b of the vane 18 may be machined and polished to form bearing surfaces or, if desired, the surfaces 18a and 18b may comprise highly polished babbitt laminations. The surfaces 18a and 18b are formed to extend at right angles from the longitudinal axis of the pie-vane and are operatively disposed in face-to-face engagement with the surfaces 16a and 16b.

At opposite sides of the vane 18 there are formed flat vane defining surfaces 19a and 19b, respectively lying in radially disposed planes and extending from the circumference of the shaft 12 to terminate at the circumference of the longitudinal cleavage or relief 18′. A plurality of screws 20 are normally inserted through the housing 10 and threaded into the vane 18 to fixedly secure the vane 18 to the wall of the cylinder 11. The screws 20 serve to insure that the vane 18 will be caused to undergo angular displacement with the cylinder wall as the housing 10 is rotated with respect to the shaft 12.

A fluid conduit or orifice passage 21 is formed to extend laterally through the vane and terminate at hydraulic ports, not designated, in communication with both pressure chambers $C_1$ and $C_2$, FIG. 4, whereby fluid may be forced through the passage 21 as the housing 10 is rotated. The design of the orifice passage or hydraulic passageway 21 may serve to dictate the characteristic of the damper's output torque. If it is found desirable to provide damper output torque proportional to the square of angular rate imposed on the housing 10, a throat 21′ approximating a hole in a thin plate may be provided within the passage 21. However, if an output torque proportional to the angular rate is desired, the orifice passage 21 may be of open-tube design. Further, it is feasible to design the vane 18 so as to provide for the establishment of fluid flow around the surfaces 18a and 18b, whereby additional output torque characteristics may be imparted to the damper, or to provide for an elimination of the passage 21.

In assembling the damper D a plurality of "O" ring and end seals 22 are seated in grooves 22′ for sealing the shaft 12 within the housing 10 in a conventional manner. Next, the sealing rod 14 is inserted into the bore 13 and seated on the seat 13′. The rod 14 is secured within the bore 13 by suitable means such as, for example, an upwardly extending compression screw 23 threaded through the lower end of shaft 12, and a ball seal 23a seated on the uppermost end of the rod 14 and held in place by a compression screw 23′ threaded into the end portion of the bore 13. The vane 18 is seated in the cleavage 15 so that the shaft 12 may now be slidingly received within the cylinder 11, whereupon the screws 20 may be threaded into the vane for securing the vane 18 to the walls of cylinder 11 and maintaining the damper in an assembled condition. Any suitable viscous hydraulic fluid, may be utilized as the damping or hydraulic fluid and provided for chambers $C_1$ and $C_2$. This fluid is introduced into the damper D with the rod 14, ball 23a and screw 23′ removed from the bore 13. The damper D is filled by lowering the temperature of the damper to zero degrees Fahrenheit and introducing the desired damping fluid at the top end of bore 13. When the chambers $C_1$ and $C_2$ have been completely filled, the sealing rod 14 and ball 23a are inserted into the bore 13 to assume an operative disposition. The screw 23′ is now threaded into bore 13 and tightened to thus seal the fluid within the chambers of the damper D.

It is to be particularly noted that while the shaft 12 fits into the cylinder 11 in a manner such as to frictionally engage the surface of the wall thereof, and the sealing rod 14 fits into the bore 13 to physically engage the surface of the walls of the bore and the surface of the relieved portion 18′ of the pie-vane 18, the tolerances therefor, particularly between the cylinder wall and shaft 12, should be such as to provide minimum clearance in the presence of thermal expansion. Fluid flow between the shaft 12 and the cylinder wall is limited by two phenomena: First, the fluid path defined between the shaft 12 and cylinder wall is provided with a path length, between chambers $C_1$ and $C_2$, sufficient to establish fluid flow resistance of a magnitude such as to require a large difference in chamber pressures in order to create significant fluid flow; and second, as the pressure differences between the chambers $C_1$ and $C_2$ is caused to increase, the resiliency of the shaft 12 permits the shaft to deflect sufficiently for decreasing the width of the fluid's path, as illustrated in FIGS. 5A and 5B. A continued increase in chamber pressure results in increased shaft deflection, whereby a substantial closing of the fluid's path between the shaft and the cylinder wall may ultimately be effected.

A similar principle is utilized in establishing an operative seal between the sealing rod 14, the vane 18, and the shaft 12, e.g., as a pressure difference between the chamber pressures is established, the rod 14 is caused to deflect as a consequence of the difference in pressures present at opposite sides of the rod. This deflection effects a closure of the fluid's path around the rod 14. In essence, the increasing pressure differences operatively established between the pressures of chambers $C_1$ and $C_2$ serve to increase the sealing characteristics of the device. This result permits the damper D to operate in an effective manner over wide temperature and pressure difference ranges, and further, affords the damper low "break-away" torque characteristics. This will be readily appreciated when it is noted that sealing characteristics and the friction established between the engaging surfaces varies directly with the operatively established pressure differences resulting from angular rate being imposed on the housing 10.

In operation; the damper D of the present invention may be assumed to be assembled in the aforedescribed manner and mounted in a "rolleron" coupling fashion on the wing or fin F of propelled missile M. The means utilized in mounting the damper D may include any suitable means, such as, for example, a conventional ring-and-pin structure 25 and slotted coupling linkage 26 fixed at opposite ends of the shaft 12. Hence it is to be understood that when the gyro-stabilized "rolleron" R becomes activated to stabilize the missile M against in-flight "roll" it must act through the damper D. As the missile M begins to "roll" the case of the gyro-stabilized "rolleron" R, and consequently the housing 10 of the damper D begins to pivot about shaft 12. As the "rolleron" case is caused to pivot, the cylinder 11 and the cylinder mounted vane 18 rotate away from the centerline CL, FIGS. 5A and 5B, about the fixed shaft 12 for thus causing the vane defining surfaces 19a and 19b to be displaced in opposite directions relative to the surfaces 17a and 17b of cleavage 15. This displacement inversely varies the volume of the chambers $C_1$ and $C_2$ for thus initiating a pressure difference between the fluids of the two chambers. As pressure difference is caused to increase, the shaft 12 is deflected toward the wall of cylinder 11 and the sealing rod 14 is deflected away from the chamber undergoing a pressure increase and toward both the pie-vane 18 and the shaft 12 under the influence of the pressure difference. This deflection serves to establish an adequate and effective seal between the chambers $C_1$ and $C_2$. Fluid flow between the bearing surfaces 16a, 18a and 16b, 18b is minimal due to the closeness of their fit. The fluid of the chamber undergoing compression must, therefore, flow in a restricted manner through the restricted orifice passageway 21 for thus establishing an output torque for the damper D as reaction forces are established on the surfaces of the chamber undergoing a pressure increase.

The differences in pressure established in the opposite chambers $C_1$ and $C_2$ are dictated, in part, by the size and configuration of the passageway 21, as hereinbefore described. Since the chambers are capable of retaining fluid under exceptionally high pressure, due to the hereinbefore described sealing characteristics of the damper, the output torque developed by the damper D may attain a much higher level than would be attainable in dampers of conventional design and equivalent size. Hence, even though excessive "roll" is imparted to the missile M a sufficient output torque may be developed by the damper D to cause the missile M to "right" itself.

It will be appreciated that as the airstream over the "rolleron" R, acting through the damper D, forces the missile M to "right" itself, a reverse rotation is imparted to the housing 10 causing the opposite chamber to undergo reduction in volume for thus relieving the pressure within the pressurized chamber until such time as the "rolleron" R is aligned with the fin F, whereupon the pie-vane 18 will center on the centerline CL, FIGS. 5A and 5B.

In view of the foregoing description it is to be understood that the damper D of the instant invention provides a reliable, simple, economical, and high performance damper having low "break-away" characteristics and adaptable to miniaturization for developing excessively high values of output torque in the presence of severe vibration, acceleration, and rapidly changing temperatures.

Obviously many modifications and variations of the present invention are possible in the light of the above teachings. For example, it is entirely practical to fix the housing 10 against rotation, while imparting angular rate to the shaft 12, and further, the housing 10 may be of any suitable shape and utilized in numerous combinations, particularly since the pie-vane and shaft are of a rugged design. It is therefore to be understood that within the scope of the appended claims the invention may be practiced otherwise than as specifically described.

What is claimed is:
1. A hydraulic rotary damper comprising, in combination:
   a damper housing including cylinder walls defining a damper cylinder;
   a rotatable cylindrical shaft mounted within said cylinder and adapted to extend longitudinally therethrough in sliding contact with said walls;
   means defining a concentric bore extending substantially through said shaft;
   means defining a shaft cleavage communicating with said concentric bore and being so arranged as to extend longitudinally along said shaft between points of termination disposed within said cylinder for establishing a unitary hydraulic chamber within said cylinder;
   an elongated sealing rod concentrically arranged within said bore in a substantially sealed relationship with the wall of said bore;
   rod mounting means including means for retaining said rod within said bore and for establishing a hydraulic seal at either end thereof;
   an elongated vane having a cross-section in the shape of a sector fitted into said unitary chamber in juxtaposition with said sealing rod including sealing means adapted to divide said unitary chamber into a pair of displaced and substantially sealed pressure chambers;
   means defining a hydraulic passage extending laterally through said vane adapted to establish hydraulic communication between said pressure chambers;
   vane retaining means fixedly securing said vane to said cylinder walls;
   hydraulic fluid disposed within each of said pressure chambers for substantially filling the volume defined thereby; and
   means for operatively coupling said shaft and said housing with respective counter-rotating force applying means whereby the shaft may be rotated relative to said cylinder for forcing said fluid through said hydraulic passage.

2. In a miniaturized, high-performance rotary damper of the type having low break-away torque characteristics and adaptable for mounting on missile "rollerons" to maintain in-flight stability for rocket propelled missiles designed to operate in an environment of severe vibration and acceleration over a wide temperature range, the improvement comprising, in combination:
   a damper housing including means for coupling said housing with a pivotably mounted missile "rolleron";
   an elongated damper cylinder wall disposed in said housing along the pivot axis of said "rolleron" defining an opening through said housing;

an elongated rotor shaft having an outside diameter approximating the diameter of said cylinder and adapted to be slidingly received within said cylinder;

means for coupling one end of said shaft to a control surface of a given missile and maintaining said shaft against rotation relative thereto;

mounting means for coupling the opposite end of said rotor shaft with said control surface to provide a mounting for said housing;

means defining a concentric bore extending longitudinally through shaft;

a semi-rigid and elongated sealing rod disposed within said bore adapted to extend substantially therethrough;

means for maintaining the ends of said rod in a sealed relationship with said shaft;

an elongated cleavage formed along said shaft within said cylinder being defined by a pair of longitudinally displaced transversely disposed shoulder bearing surfaces formed in said shaft extending normally from said wall to a pair of substantially flat vane defining surfaces formed in said shaft to extend in radial planes from said bore to said wall;

an elongated pie-vane disposed within said cleavage having a generally triangular cross-section configuration with the base thereof being convex in shape to conform to said wall and the apex thereof being concave to receive a portion of said rod;

means defining a pair of bearing surfaces formed at either end of said pie-vane and extending from said wall to said rod normal to the longitudinal axis thereof and in face-to-face engagement with said shoulder bearing surfaces;

means defining a pair of elongated vanes formed along either side of said pie-vane extending radially from said wall to terminate at opposite sides of said bore;

means fixedly securing said pie-vane to said wall, whereby a pair of pressure chambers are formed, each being defined by the vane defining surfaces of said shaft and said pie-vane, an elongated portion of said sealing rod, and said shoulder bearing surfaces;

means defining at least one hydraulic passageway having a predetermined configuration extending between said formed pressure chambers through said pie-vane, whereby hydraulic fluid may be transferred between the chambers under the influence of operative chamber pressure differences;

hydraulic fluid disposed within said chambers for substantially filling same; and ring seals disposed about the outer surface of the shaft between said cleavage and the outermost ends of said cylinder, whereby as the "rolleron" is caused to pivot about its pivot axis, under the influence of forces applied while the missile is in flight, the vane defining surfaces of said pie-vane are displaced relative to said vane defining surfaces of said cleavage to inversely vary the fluid pressures of the hydraulic fluid within said chambers and force the fluid through said hydraulic passageway for thus dissipating the applied forces in the form of energy of heat.

3. In a rotary hydraulic damper, means comprising: cylinder having an internal surface defining wall; a cylindrical shaft having an internal bore rotatably mounted in sliding engagement with said wall;

at least one pair of circumferentially displaced and radially extending vanes defined by opposite surfaces of a relieved section of said shaft;

a laterally extending member having a cross-section in the shape of a sector fixed to said wall including circumferentially displaced vane defining side surfaces extending radially toward the center of said cylinder between said pair of oppositely disposed vanes for partially forming at least one pair of circumferentially displaced fluid chambers disposed at opposite sides of said member;

a slidingly mounted sealing rod disposed concentrically within said internal bore in juxtaposed relationship with said laterally extending member for forming a seal between said member and said shaft;

said shaft being adapted to deflect under pressure differential in said at least one pair of circumferentially fluid chambers thereby causing a positive seal between said shaft and said laterally extending member; and means defining a hydraulic conduit extending from one to the other of said at least one pair of fluid chambers.

4. The combination as defined in claim 3, further comprising:

first means operatively fixing said cylinder to a first structural member;

second means operatively coupling said shaft to a second structural member, whereby said first and said second means may be mutually displaced to impart rotation to said shaft relative to said cylinder;

means for completely defining said chambers; and hydraulic fluid disposed within each of said chambers.

5. The combination as defined in claim 4 wherein said means for completely defining said chambers comprises:

a pair of transverse and mutually displaced shoulder surfaces extending in planes normal to said vanes with said vanes being disposed therebetween and adapted to abut said walls of said cylinder at opposite end surfaces of said member to substantially seal said pair of fluid pressure chambers, whereby induced rotation of said shaft relative to said cylinder serves to displace the vanes defined by surfaces of said relieved section of said shaft relative to the vanes defined by the said surfaces of said member for forcing the hydraulic fluid through said fluid passageway.

References Cited by the Examiner
UNITED STATES PATENTS

| | | | |
|---|---|---|---|
| 933,076 | 9/1909 | Houdaile | 74—574 |
| 2,286,516 | 6/1942 | Swanson | 188—93 |
| 2,851,128 | 9/1958 | Kuhn, Jr. | 188—93 |
| 2,935,947 | 5/1960 | Jagiello | 102—50 |

References Cited by the Applicant
UNITED STATES PATENTS

| | | |
|---|---|---|
| 2,629,127 | 2/1953 | Conklin et al. |
| 2,742,113 | 4/1956 | O'Connor. |
| 3,039,116 | 6/1962 | Waggott. |

SAMUEL FEINBERG, *Primary Examiner.*

BENJAMIN A. BORCHELT, *Examiner.*

V. R. PENDEGRASS, *Assistant Examiner.*